Oct. 21, 1941.                J. B. KUCERA                2,259,753
                         TRACTOR HITCH MECHANISM
                            Filed April 24, 1940

Inventor

By Joseph B. Kucera,

G. C. Kennedy
                Attorney

Patented Oct. 21, 1941

2,259,753

UNITED STATES PATENT OFFICE 2,259,753

TRACTOR HITCH MECHANISM

Joseph B. Kucera, Clark Township, Tama County, Iowa

Application April 24, 1940, Serial No. 331,276

6 Claims. (Cl. 280—33.10)

My invention relates to improvements in tractor hitch mechanism, constructed and adapted to be removably and adjustably mounted on rear parts of a tractor to transmit the draft thereof to a connected vehicle or implement in the rear.

One object of my improvements is to permit lateral adjustments of the hitch to either side of the tractor whereby the following vehicle or implement may effect short turns to either side adjustably.

Another object of my improvements is to provide at either side of the hitch mechanism related pairs of adjustably mounted arms for carrying and adjustably supporting an arcuate cross member, whose extremities are rockably connected to the rear parts of the arms and adapted for adjustments vertically as desired, with a traveler hitch appliance on the cross member mounted to be releasably connected to said cross member, to travel to or fro along it in towing a vehicle or other body following it.

Another object of my improvements is the provision of means for controlling the tractor in moving up grade by tilting it forwardly by a controlling means at the rear at times of necessity.

These improvements, together with other specific features forming parts of my invention, are hereinafter described and claimed, and also illustrated in the accompanying drawing.

Figures 1, 2:
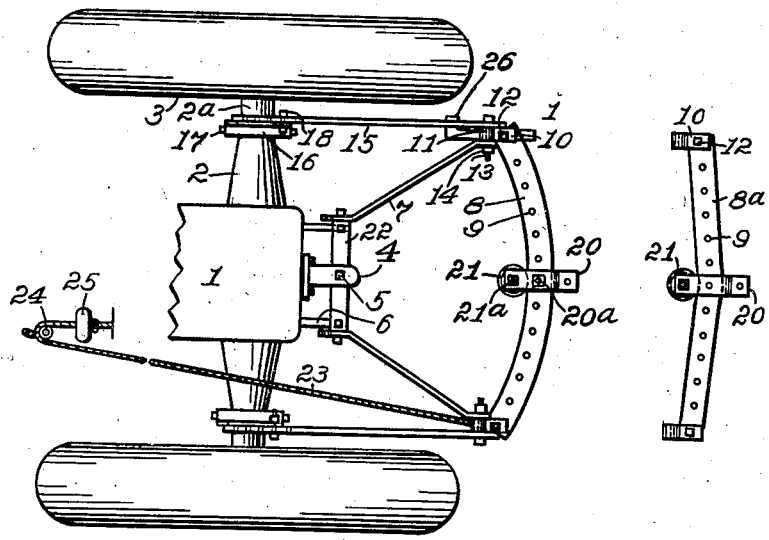
Figure 3:
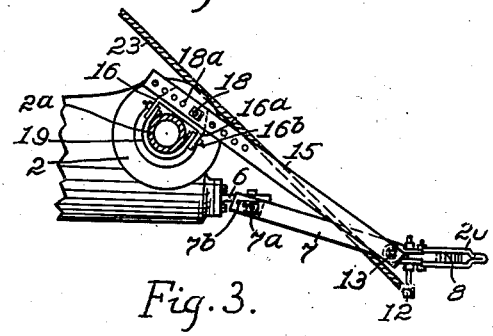
Figure 4:
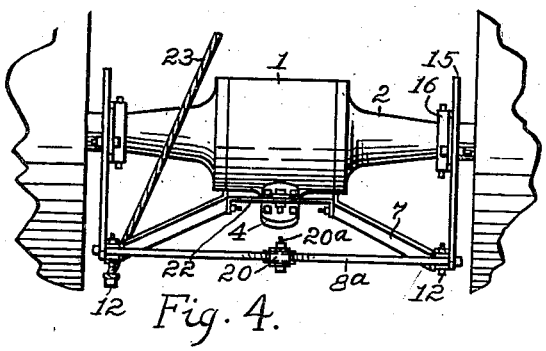

Fig. 1 is a top plan of the rear part of a tractor with the forward parts broken away, displaying the hitch mechanism adjustably mounted thereon. Fig. 2 is a top plan of a variation in said cross member. Fig. 3 is a side elevation of the rear body part of the tractor, showing said cross member, clevis and the pairs of coacting adjustable arms in one adjusted position. Fig. 4 is a rear elevation of the rear part of the tractor, with parts broken away, showing said clevis and said arms in one relatively adjusted position as supported on the tractor.

The numeral 1 denotes the rear end of the body of a tractor, and 2 denotes the conical housings of the axle parts 2a, the latter carrying the wheels 3. At the rear, the body 1 has spaced fixed arms 6 connected rigidly by a bar 22 by bolts. The body 1 has a medial fixed arm 4 to which said bar 22 is bolted at 5. Divergent arms 7 are adjustably pivoted at their forward ends to the cross-bar 22. The forward parts of said arms have each a plurality of bolt holes 7b therealong to receive in either a bolt and nut connection 7a, securing the arms to the said parts 6, see Fig. 3.

In Fig. 1, is shown an arcuate bar 8 hollowed forwardly, positioned transversely, having evenly spaced holes 9 therealong to receive a removable bolt 20a, which also traverses the spaced members of a clevis 20, the forwardly directed members having apertured seats therein for the pintle 21a of a wheel 21 which rolls along the arcuate forward edge of the cross bar 8, when the pintle 20a is removed. At each end of the cross bar 8 a U-shaped clip 10 has its members spanning the end parts of the bar 8 and connected thereto by a bolt 12, and the forward loop of each clip, also the rear end parts of arms 7 and 15 are traversed by bolt and nut connections 13 and 14. The arms 15 extend forwardly in parallel. As shown in Fig. 3 the forward end parts of the arms 15 cross above the axle parts 2a and have therealong a plurality of bolt-holes 18a, any of which may receive a bolt and nut connection 18, permitting adjustable shifting of the bolts 18 along the arms 15 to swing up or down respectively the associated bars 15 and 7, in the likewise lifting or lowering of the cross-bar 8, and it will be understood that the latter is mounted rockably at its ends on the pintles 13. As shown in Fig. 3, a C-shaped clamping member 16, or angle-bar, is connected by an apertured flange, at each side, to the arms 15 adjustably by said bolts 18. The angle-bars 16—16a have their downturned extremities (see Fig. 3) connected to yoke members 19, clamped about the axle parts 2a by bolts 16b. The curvate member 8 may, when desired, be replaced by the member 8a shown in Fig. 2, when it is desired to seat the wheel 21 normally in a medial short curved medial part of the member, the side parts of the latter being straight and inclined at a small angle forwardly. This medial curved forward part normally seats the wheel 21 in its concavity. It will be seen, that the cross-bar 8 may be swung up or down to adapt itself to be on a level with a connecting member (not shown) of a wheeled device in the rear of the tractor, due to adjustments of the members 7 and 15 relatively to each other. When the clevis bolt 20a is removed, the clevis 20 will shift along the cross-bar 8 to either side of the bar, permitting short turns of the tractor and the following conveyance, but the bolt 20a may be used to traverse any of the holes 9 in the bar 8, including the clevis, in relatively varying the widths of turns. Also relative adjustments of the pairs of bars 7 and 15, permit different vertical adjustments of the bar 8 and clevis relative to the tractor ahead.

A special feature of my invention as shown in the drawings, is the provision of means for governing or controlling the tractor at times when, in moving upgrade or tilting upwardly forwardly at any time it becomes necessary to prevent such tilting. The numeral 23 denotes a flexible cord or connection having its rear end secured to the depending headed end of one or the other of the bolts 12, the cord extending thence forwardly over the tractor 1, as best shown in Figs. 1 and 3. In Fig. 1, the numeral 25 denotes a foot pedal which is limitedly rockably mounted on the chassis of the tractor, and the cord 23 is reeved about a pulley 24 linked to the chassis ahead of the pedal, and is then end-connected to the pedal stem 25. This device is provided for occasional use when, as in ascending a grade, or in ordinary use along a highway or other path, the tractor may tilt upwardly forwardly, and to obviate this inconvenience the driver is not required to take any other measure to tilt back the tractor, because on moving the pedal to pull the cord 23, the arms 7 and 15 are acted upon to tension the cord to thus maintain the cross member 8 in a horizontal position relative to the highway and to the vehicle hitched thereto, or in parallel to inclined planes traversed. As the cross member 8 is rockable vertically, it is desirable to prevent such rocking of the bar downwardly beyond the horizontal, hence I have supplied an arm 26 mounted on one of the end clamps 11 rigidly, to extend forwardly with an offset end part 10 beneath the adjacent arm 15 as a stop, for the member 8, which, however may be rocked upwardly.

I claim:

1. In a tractor hitch mechanism, in combination, a tractor, spaced rearwardly projecting arms rockably mounted thereon adjustably, a forwardly concave arcuate cross-bar supported on the rear ends of said arms for limited rocking movements in one direction, a movable draft connection freely slidably mounted on the cross-bar, the cross-bar having spaced pin-holes therealong, means for seating removably the draft connection adjustably along the cross-bar by insertion in any pin-hole, a rockable pedal on the tractor, a pulley rotatably mounted on the tractor in advance of the pedal, and an inextensible flexible cable connected to said cross-bar, carried forwardly and around said pulley and end-secured to said pedal.

2. In a tractor hitch mechanism, in combination, a tractor, transversely spaced arms mounted rockably on and extending rearwardly from the tractor, a rockable cross-bar end-connected to and between said arms, a draft connection slidably connected to the cross-bar, an inextensible flexible cable end-connected to the cross-bar, and movable means mounted on the forward part of the tractor and connected to the forward part of the cable for exercising a downward tension on the forward end of the tractor to maintain it against upward swinging when the tractor is mounting upon an inclined surface.

3. A tractor hitch device, comprising in combination, spaced rearwardly outwardly directed arms having their forward ends pivotally connected to the end part of a tractor, shackles mounted on the axle-housing of the tractor, an outer pair of arms having their forward end parts longitudinally apertured, bolts connected to said shackles and adapted to be seated adjustably in any of the apertures in the latter arms, a limitedly tiltable rearwardly bent transverse member having end parts positioned between the rear end parts, pivotally, of the outer and inner pairs of arms, means for releasably securing said end parts together, the bent transverse member having a plurality of bolt-holes therealong, and a traction-hitch device having a pintle removably seated in any of the bolt-holes.

4. A tractor hitch device, comprising in combination, a tractor having axle housings, a transversely spaced pair of arms having their forward end parts rockably and adjustably connected to said housings and projecting rearwardly in parallel downwardly sloping relation, a rearwardly projecting arm fixed medially on the rear end of the tractor, spaced parallel arms fixed on the rear end of the tractor at opposite sides of said medial arm, a transverse bar spaced from the end of the tractor said bar being fixed to and crossing said medial and spaced pair of arms, another pair of arms having their forward ends adjustably and rockably mounted on the ends of said transverse bar and then bent outwardly obliquely rearwardly with their rear end parts bent longitudinally rearwardly and spaced in parallel relation with the rear end parts of the first mentioned pair of arms, a rearwardly medially bent cross-bar having alined bolt-holes therealong mounted for limited rocking movement with its extremities between the spaced opposite rear end parts of the first mentioned pair of arms and the obliquely outwardly directed arms, a forwardly open looped device slidably mounted on and across the bent cross-bar said device including spaced upper and lower members having vertically alined bolt holes, a bolt and nut device, the bolt adapted to traverse any of the holes in the bent cross-bar and the nut removably secured on the bolt, and a traveler wheel with hollowed edge rotatably mounted on and between the spaced forward end parts of the looped device to ride along the forward edge part of the cross-bar adjustably and removably.

5. A tractor hitch mechanism, comprising in combination, a tractor body with axle housings, a clamping device rockably mounted on each axle housing and having an upwardly directed apertured flange, rearwardly downwardly inclined parallel arms having alined bolt-holes along their forward parts adapted to coincide with the bolt-holes of the flanges adjustingly, bolt and nut connections between said arms and flanges and traversing the communicating holes thereof, a transversely spaced pair of arms having between the first-mentioned arms their forward ends rockably connected to the tractor body, thence bent laterally outwardly slopingly to have their rear end parts spaced apart from the apposed rear parts of the first pair of arms, a forwardly concaved longitudinally plurally apertured transverse bar having forwardly directed end parts positioned between said apposed rear parts of both pairs of arms, said apposed arm parts and transverse bar terminations having pivotal connections, with stops on the rear parts of the outer arms to limit the downward swinging of the concaved bar, and an apertured hitch device crossing said transverse bar loosely with a headed pin traversing removably the aperture of the hitch device and any aperture of the concave bar, the hitch device consisting of a U-shaped bar spanning the concave bar, and a roller mounted between the forward parts of the U-shaped bar rotatably to ride along the forward edge of the concave bar, when the pin has been removed.

6. In a tractor hitch mechanism, in combination, a tractor with axle housings, a transversely spaced pair of arms fixed rigidly on and projecting rearwardly from said housings, a transversely spaced pair of arms connected to the first pair of arms for rearward adjustments and for vertical swinging, said second pair of arms diverging obliquely laterally outward, a transverse forwardly bent cross-bar having a plurality of spaced bolt-holes therealong and having its terminations limitedly rockably connected to the rear ends of said diverging arms, a third pair of transversely spaced arms pivotally connected to the connected end parts respectively of said diverging arms and the end parts of the said cross-bar, and projecting forwardly across and over the axle housings, coacting means mounted respectively between the forward end parts of said third pair of arms and the axle housings for forward and rear adjustments across the axle housings, a hitch device mounted ridably on and along said cross-bar and having a bolt-hole therein, a bolt and nut device adapted to adjustingly traverse any of the holes in said cross-bar removably, the forward end parts of the second pair of arms having a plurality of longitudinally separated bolt-holes therealong, single opposing, bolt holes in each of the said first pair of arms, and a bolt and nut device for traversing the single bolt holes of the first pair of arms and for traversing any of the holes of the forward parts of the second pair of arms for forward and rear longitudinal adjustments of said cross-bar.

JOSEPH B. KUCERA.